Nov. 11, 1952   H. R. NASH   2,617,489
VEHICLE DRIVE AXLE ROLLER AND WHEEL ASSEMBLY
Filed May 13, 1950   2 SHEETS—SHEET 2
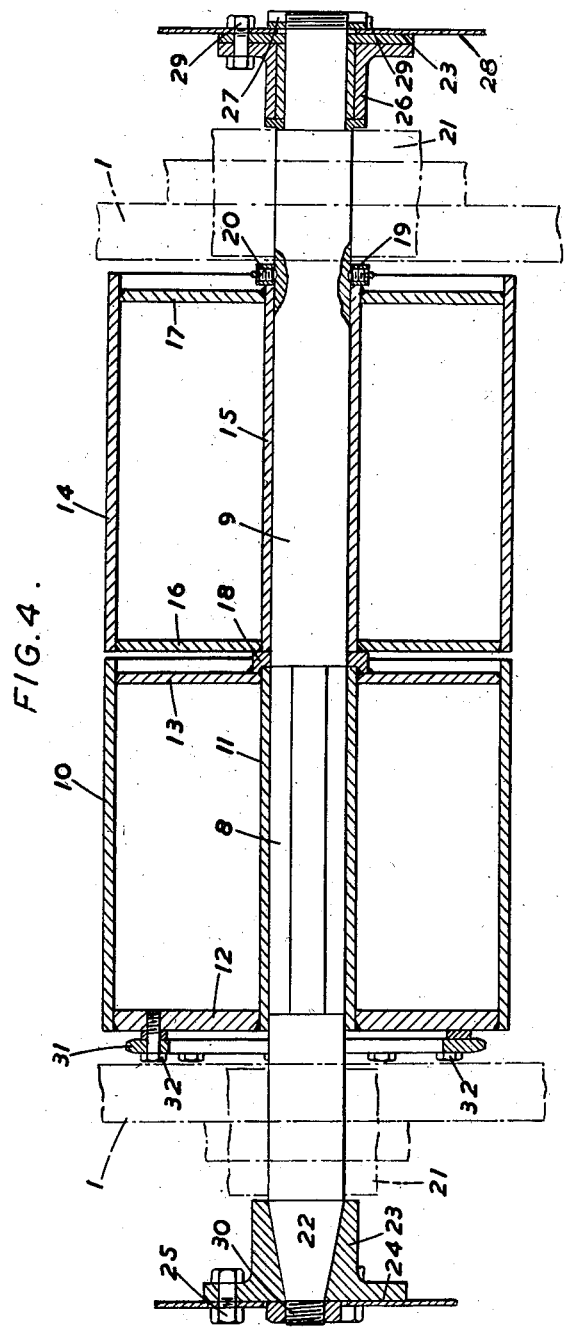
Inventor:
HENRY ROBERT NASH Patented Nov. 11, 1952

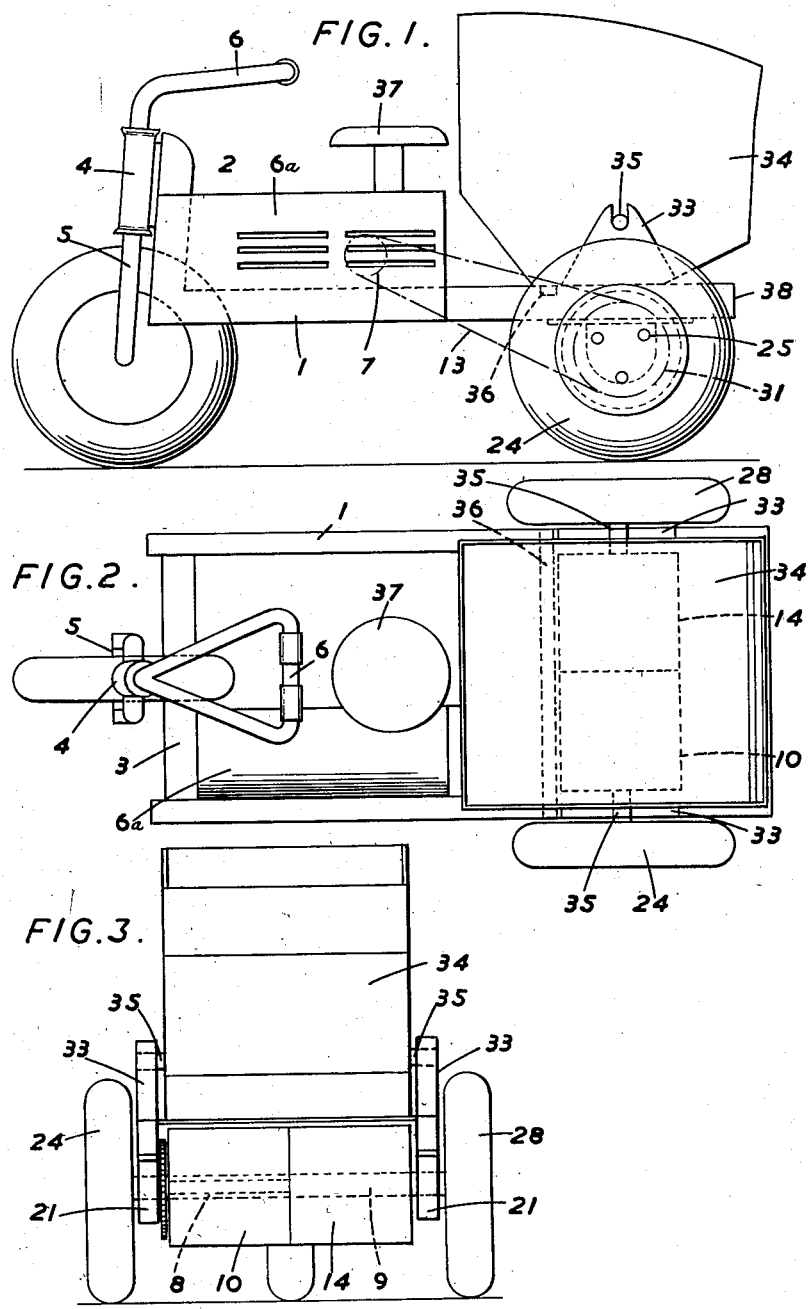

2,617,489

UNITED STATES PATENT OFFICE 2,617,489

VEHICLE DRIVE AXLE ROLLER AND WHEEL ASSEMBLY

Henry Robert Nash, Leigh, England

Application May 13, 1950, Serial No. 161,795
In Great Britain February 17, 1949

1 Claim. (Cl. 180—20)

This invention relates to vehicles of the kind used mainly for horticultural or agricultural purposes but which may also be used on the road for transporting and towing other vehicles.

Hitherto it has been found that with the majority of vehicles they are either too large for use in comparatively small areas and are highly expensive to manufacture and owing to their weight are not always efficient when travelling on muddy or wet ground.

It is an object, therefore, of the present invention to overcome the aforesaid disadvantage and to provide a vehicle which has greater efficiency in towing and which may be used for a large number of purposes.

Accordingly the present invention comprises a three wheel vehicle including in combination a chassis, a rear axle on the chassis for supporting a pair of demountable wheels and a roller or rollers, a fork in the front of the chassis for supporting a steering wheel or roller and a prime mover on said chassis for driving said vehicle. Preferably the drive from the prime mover is taken to the rear axle which is of such shape that the driving wheels and roller rotate therewith. Therefore, according to a further feature of the invention, one section of the rear axle is of polygonal cross-section, the remainder of said axle being of circular cross-section, one of the rollers having an internal sleeve to fit said polygonal section whereby said roller is locked to said axle and rotates therewith, the second roller having an internal circular cross-sectioned sleeve free to rotate on said axle, a sprocket secured to said axle and a chain associated with said sprocket connected to the prime mover to drive said axle, the road wheels being removably secured to the axle to permit the vehicle to be driven on the wheels or on the rollers.

In order to convert the vehicle to a roller, the rear and front wheels may be removed and the front wheel replaced by a roller.

A still further feature of the invention is the provision of a container or hopper or the like pivotally mounted towards the rear end of the chassis.

In order that the invention may be more easily put into practice, a convenient embodiment thereof is described by way of example with reference to the accompanying diagrammatic drawing in which:

Figure 1 shows a side elevation of the vehicle.

Figure 2 is a top plan view of the vehicle.

Figure 3 a rear elevation of the vehicle shown in Figure 1, and

Figure 4 shows a section of the rear axle of the vehicle.

Referring to the drawing, the vehicle comprises a chassis 1 of rectangular shape, the side sections of which are upwardly turned as at 2 and are connected by means of a cross-bar 3. Secured in any convenient manner to the cross-bar 3 is a head stem 4 for supporting a fork 5 and a steering bar 6.

Mounted towards the forward end of the chassis is a prime mover such for example as an internal combustion engine, the engine being enclosed or partly enclosed by means of a cover 6a. The engine is provided with a gear box, not shown, which in turn is connected to a sprocket shown diagrammatically at 7, the purpose of which will hereinafter be described.

A detailed construction of the rear axle is shown in Figure 4 in which the polygonal portion 8 of the axle is shown, in the present instance, to be of hexagonal cross section, the remainder of the axle 9 being of circular cross section. Secured to the hexagonal portion 8 is a roller 10 this roller having a hexagonal sleeve 11 welded to the roller by means of end plates 12 and 13, the sleeve 11 being a tight fit on the hexagonal portion 8 of the shaft. In addition to the roller 10 a second roller 14 is provided and is freely mounted on the circular sectioned portion 9 of the shaft by means of a sleeve 15 welded to the roller 14 by means of end plates 16 and 17, the sleeve 15 being free to rotate on the circular cross section portion 9 of the axle. The rollers 10 and 14 being spaced apart by means of a collar 18, this collar also locating the position of the roller 10 on the shaft, the roller 14 being located by means of a collar 19 fixed to the shaft by set screws 20.

The axle is mounted on the chassis 1 through roller bearings illustrated in dot and dash line by the reference 21.

The shaft is tapered at 22 for the reception of a hub 23 to which one of the road wheels, 24, is secured by means of studs 25. The other end of the shaft is reduced in diameter and a bearing hub 26 is secured thereto by means of a nut 27, the second road wheel 28 being secured to the hub by means of studs 29. The hub 23 is locked by means of the nut 30. When it is desired to drive the vehicle on the rollers it is only necessary to undo the studs 25 and 29 and remove the wheels and to replace these wheels when it is desired to drive the vehicle thereon.

In order to drive the rear axle a power unit, in this case an internal combustion engine, is driven through a gear box (not shown) provided with a sprocket 7, and a sprocket 31 is secured to the end plate 12 of the roller 10 by means of studs 32, a chain 13 passing from the sprocket 7 round the sprocket 31 so that in operation the sprocket 31 is rotated which in turn rotates the roller 10 and as this roller is locked to the shaft by the hexagonal sleeve engaging with the hexagonal portion of the shaft the latter will also be rotated. Thus a drive is ensured whether the vehicle is driven either on the rollers or on the wheels.

In addition to the vehicle being used either as a conveyor or as a roller, the rollers are advantageous when driving through thick mud, as they prevent the vehicle from sinking in and provide an extra grip on the surface of the ground thereby assisting in the propulsion of the vehicle. Furthermore owing to the weight of the rollers they act as a fly wheel to the engine.

Mounted on slotted bearings 33 is a hopper or container 34 having trunnions 35 supported in the bearings 33. The hopper 34 is thus pivotally mounted on the chassis and may be tipped towards the rear to allow the contents thereof to be removed, the position of the bearing being such that when the hopper is in the position shown in the drawing, it is maintained in the upright position with the bottom of the hopper resting on the crossbar 36, so that it is maintained in the upright position by its own weight. If desired a catch may be provided for locking the hopper in the upright position.

The tractor is also provided with a seat 37 and the rear end 38 may be provided with a draw-bar or tool-bar to which may be attached various tools required in horticulture or agriculture, such for example as a gang mower, discs, hoes or the like, or if desired a trailer may be towed by the tractor and still further, if desired, a mower with a grass box may be incorporated with the chassis.

From the foregoing description it will be seen that a tractor of simple construction is provided which is also a self-contained roller and cart and which may be used for a considerable number of purposes and is eminently suitable for use in medium or small estates and areas where larger tractors are not possible.

It is also eminently suitable for use where the ground is on a gradient and where normally a wheel-barrow could not be used.

Owing to the simple construction of the tractor, the rear wheel base may be confined to small limits, such that the tractor may be driven along a garden path or through a normal sized gate.

Having thus described the invention, what is claimed as new and desired to be secured by Letters Patent, is:

A vehicle adapted to move over a ground surface comprising a chassis, a front ground wheel steerably mounted on said chassis, a continuous rear axle extending transversely of said chassis and rotatably mounted therein with its ends projecting outwardly of the sides of said chassis, wheel attachment means fixed to one end of said axle, wheel attachment means rotatably mounted on the other end of said axle, wheels removably secured to said attachment means, at least two rollers centrally mounted in end to end relation on said axle, the diameter of said rollers being smaller than that of the wheels, means drivingly connecting at least one of said rollers to said axle for rotation therewith, motive means on said chassis, and a driving connection between said motive means and the roller which is drivingly connected to said axle.

HENRY ROBERT NASH.

REFERENCES CITED

The following references are of record in the file of this patent:

UNITED STATES PATENTS

| Number | Name | Date |
|---|---|---|
| 1,338,510 | Kilgore | Apr. 27, 1920 |
| 1,419,916 | Bull | June 20, 1922 |
| 1,424,224 | Westmont | Aug. 1, 1922 |
| 1,994,929 | Stegeman | Mar. 19, 1935 |
| 2,096,911 | Moore Jr. | Oct. 26, 1937 |
| 2,164,845 | Steed et al. | July 4, 1939 |

FOREIGN PATENTS

| Number | Country | Date |
|---|---|---|
| 721,120 | France | Feb. 29, 1932 |